United States Patent [19]

Krude

[11] Patent Number: 5,290,203
[45] Date of Patent: Mar. 1, 1994

[54] CONSTANT VELOCITY UNIVERSAL JOINT HAVING HIGH STRESS RESISTANCE

[75] Inventor: Werner Krude, Oxford, Mich.

[73] Assignee: GKN Automotive, Inc., Auburn Hills, Mich.

[21] Appl. No.: 884,040

[22] Filed: May 14, 1992

Related U.S. Application Data

[63] Continuation of Ser. No. 677,358, Mar. 26, 1991, abandoned, which is a continuation of Ser. No. 384,836, Jul. 25, 1989, abandoned.

[51] Int. Cl.⁵ .............................................. F16D 3/223
[52] U.S. Cl. .................................. 464/145; 464/906
[58] Field of Search ............................ 464/143–145, 464/906

[56] References Cited

U.S. PATENT DOCUMENTS

| | | | |
|---|---|---|---|
| 1,665,280 | 4/1928 | Rzeppa | 464/145 |
| 1,916,442 | 7/1933 | Rzeppa | 464/906 X |
| 2,309,939 | 2/1943 | Dodge | 464/906 X |
| 2,322,570 | 6/1943 | Dodge | 464/906 X |
| 3,324,682 | 6/1967 | Bendler | 464/145 |
| 3,370,441 | 2/1968 | Aucktor | 464/906 X |
| 3,541,809 | 11/1970 | Howey | 464/145 |
| 3,879,960 | 4/1975 | Welschof et al. | 464/145 |
| 4,116,020 | 9/1978 | Aucktor et al. | 464/145 |
| 4,188,803 | 2/1980 | Otsuka et al. | 464/145 |
| 4,608,028 | 8/1986 | Welschof et al. | 464/145 |
| 4,610,643 | 9/1986 | Krude | 464/143 |
| 4,756,640 | 9/1988 | Gehrke | 464/145 X |

FOREIGN PATENT DOCUMENTS 55-72921  6/1980  Japan ...................... 464/145

*Primary Examiner*—Daniel P. Stodola
*Attorney, Agent, or Firm*—Harness, Dickey & Pierce

[57] ABSTRACT

A constant velocity universal joint for transmitting driving torque between rotative members, such universal joint including a hub fixed to one of the rotative members and an outer joint member attached to the hub, an inner joint member attached to another one of the rotative members and a ball containing cage positioned between the outer joint member and the inner joint member. The balls are engaged in ball races positioned in the outer joint member and in the inner joint member. The ball races are sloped so as to provide maximum material at the location of highest stress, the major ball races being of the undercut free design.

22 Claims, 4 Drawing Sheets

CONSTANT VELOCITY UNIVERSAL JOINT HAVING HIGH STRESS RESISTANCE

This is a continuation of U.S. patent application Ser. No. 07/677,358, filed Mar. 26, 1991 now abandoned which was a continuation of U.S. patent application Ser. No. 07/384,836, filed Jul. 25, 1989 now abandoned.

BACKGROUND OF THE INVENTION

1. Field of the Invention

The present invention relates to a constant velocity universal joint for use in any application requiring torque transmission through a varying angle. More particularly, the invention involves a universal joint that utilizes a plurality of balls to transmit a torque from an inner joint member to an outer joint member. The interior of the outer joint member contains a series of grooves that are in radial alignment with a complementary series of grooves that are positioned on the exterior of the inner joint member. A cage is positioned between the outer joint member and the inner joint member to guide the balls as they traverse the grooves during articulation of the universal joint.

2. Description of the Prior Art

The prior art reveals a wide variety of devices that permit the transmission of a rotational torque from one shaft that is angularly displaced with respect to another shaft coupled thereto. In general, most of the prior art devices require extensive machining of the individual parts to assure satisfactory assembly and operation of the device. Then, too, the overall strength of the prior art devices was compromised by the required machining of the individual parts.

The present invention differs from the undercut-free constant velocity joint that is shown and described in U.S. Pat. No. 3,879,960, entitled "Constant Velocity Joint" issued Apr. 29, 1975, to Hans-Heinrich Welschof et al. The constant velocity joint described in the above-referenced patent shows an outer joint member in which the individual ball grooves are divergent with respect to the central axis of the universal joint, when viewed from the open end of the outer joint member. The ball grooves that are positioned in the inner joint member are convergent with respect to the central axis of the universal joint. The balls are maintained in a spaced apart planar relationship with one another by means of a cage that is positioned between the outer joint member and the inner joint member. The outer joint member does not lend itself to press forging techniques since the opening therein is of smaller diameter than the diameter of the interior cavity therein. Also, the lip of the outer joint member is thin because of the divergent nature of the ball grooves. The thin areas of the outer joint member occur at one of the areas of maximum stress in the universal joint, particularly when large angles of articulation are employed.

Thus, the present invention differs from the above-described universal joint in that the divergence and convergence of the ball grooves in the outer joint member and the inner joint member are in reverse order. Then, too, the free end of the outer joint member is of increased thickness in the present invention.

In U.S. Pat. No. 4,188,803, entitled "Constant Velocity Universal Joint" issued Feb. 19, 1980, to Nobuyuki Otsuka et al, there is shown a universal joint that employs an input and an output shaft. The output shaft has a cavity containing hub into which is fitted the end of the input shaft. The input shaft contains an inner member attached thereto. The inside of the hub and the outside of the inner member contain ball grooves. A ball cage is positioned between the hub and the inner member. The ball cage is unique in that its inside and outside surfaces contain spherical surfaces that are eccentric instead of the usual concentric spherical surfaces. The ball cage is supported on spherical surfaces that are also eccentric.

The present invention utilizes substantially concentric spherical surfaces. Further, the present invention does not have any undercuts that must be made in the hub area as does the above reference. The ball cage of the present invention is quite simple with concentric spherical surfaces being employed. Also, the hub and inner torque members utilize concentric spherical surfaces.

Another example of the prior art is shown in U.S. Pat. No. 4,610,643, entitled "Rotary Constant Velocity Universal Joint" issued Sep. 9, 1986, to Werner Krude. The universal joint shown in the U.S. Pat. No. 4,610,643 has an outer joint member in which the ball grooves are convergent as viewed from the open end of the outer joint member and the grooves in the inner joint member are divergent. This arrangement or slope of the grooves is just the opposite to that seen in the previously discussed U.S. Pat. No. 3,879,960. The outer joint member is separate from the axle-hub combination with which it coacts. A cylindrical sleeve unites the outer joint member to the hub by welding and crimping techniques. A ball cage supporting element is used to retain the balls in the grooves to engage the balls on one side. The ball cage supporting element does not contact the spherical surfaces of the outer joint member or the inner joint member, but instead, the ball cage contacts a spherical surface 30 in the interior of the joint near the central hub as shown in FIG. 1. In the above-described patent, the ball cage contains a series of fingers that are intercalated with respect to the balls. This universal joint requires extensive machingin to fabricate the joint as well as complicated tools for fabricating the various details.

The present invention is an improvement over the universal joint shown and described in the U.S. Pat. No. 4,610,643, in that fewer parts are utilized and there is less frictional contact with the ball cage. Additionally, the present invention provides a ball cage with apertures therein that completely circumscribes each ball. Further, by providing a universal joint with an outer joint member having a thick structural section near its open end, the area of highest load concentration upon articulation, the joint is more reliable and durable. The outer joint member fabrication is simplified and the cost of fabrication is significantly reduced.

SUMMARY OF THE PRESENT INVENTION

The present invention is a constant velocity universal joint for use in transmitting a driving torque from a first axial direction to another axial direction, angularly disposed with respect to the first direction.

The invention includes an outer joint member that contains a plurality of axially extending grooves therein. An inner joint member is positioned within the outer joint member and a plurality of mutually dependent grooves are carried by the inner and outer joint members. The outer joint member is coupled to a hub that is formed as an integral part of a first torque transmitting shaft and a plurality of balls are held in planar relationship to one another by a cage that is positioned between and in contact with the outer and inner joint members. A second torque shaft is coupled to the inner joint member by any convenient disconnect means.

A primary object of the present invention is to provide a universal joint that requires a minimum amount of machining in the manufacture thereof.

Another object of the present invention is to provide a universal joint in which the major components are undercut-free.

A further object of the present invention is to provide a design that lends itself to cold impact press forming of the parts of the universal joint.

Another object of the present invention is to reduce the contact area of the ball cage with the outer joint member and the inner joint member of the universal joint.

Still another object of the present invention is to provide a universal joint with enhanced strength characteristics.

A further object of the present invention is to provide a universal joint that is easy to assemble and disassemble.

Further objects and advantages of the present invention will become apparent from the following description and the appended claims, reference being made to the accompanying drawings forming a part of this specification, wherein like reference characters designate corresponding parts in the several views.

It is to be understood that the present invention is not limited to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

DETAILED DESCRIPTION OF THE PREFERRED EMBODIMENT

Figure 1B:
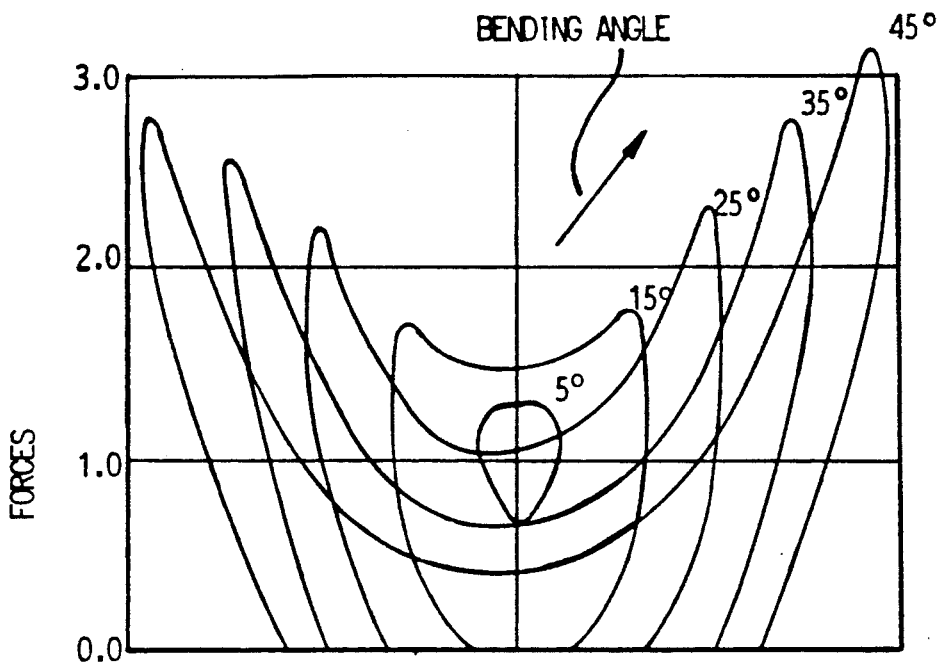
FIG. 1B is a graphical representation of the prior art under-cut free constant velocity joint forces experienced in the ball track as the bending angle decreases.
Figure 1A:
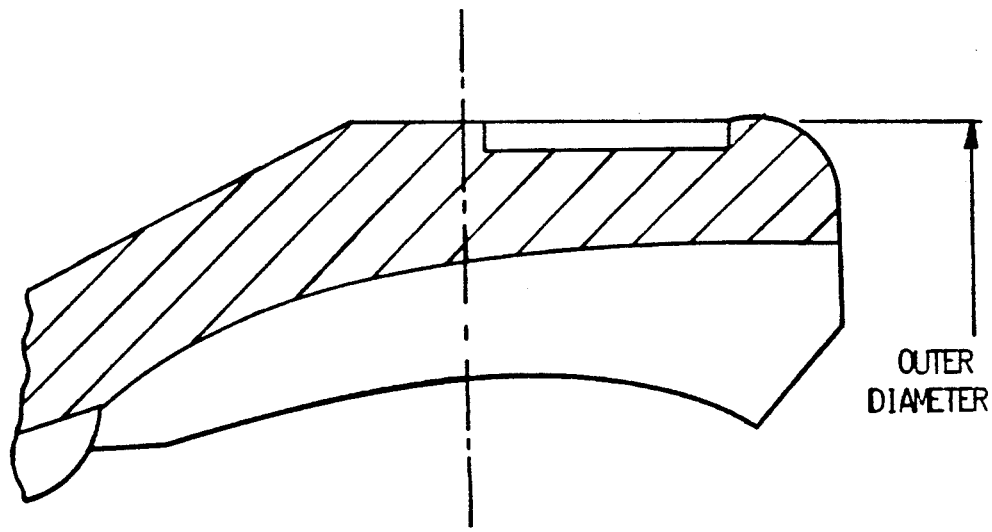
FIG. 1A is a part sectional view of a prior art undercut-free outer joint member.

Referring to the drawings and more particularly to FIG. 1A, there is illustrated a prior art undercut-free constant velocity universal joint in part section view that has application for many uses such as the coupling of drive shafts and other applications. The graph illustrated in FIG. 1B represents the forces experienced in the outer joint member as the bending angle increases. The bending angle is the angle of articulation between the central axis of the outer joint member and the central axis of the inner joint member. The graph clearly shows that the greatest forces are experienced at maximum bending angles and in the area near the open end of the outer joint member.

Figure 1:
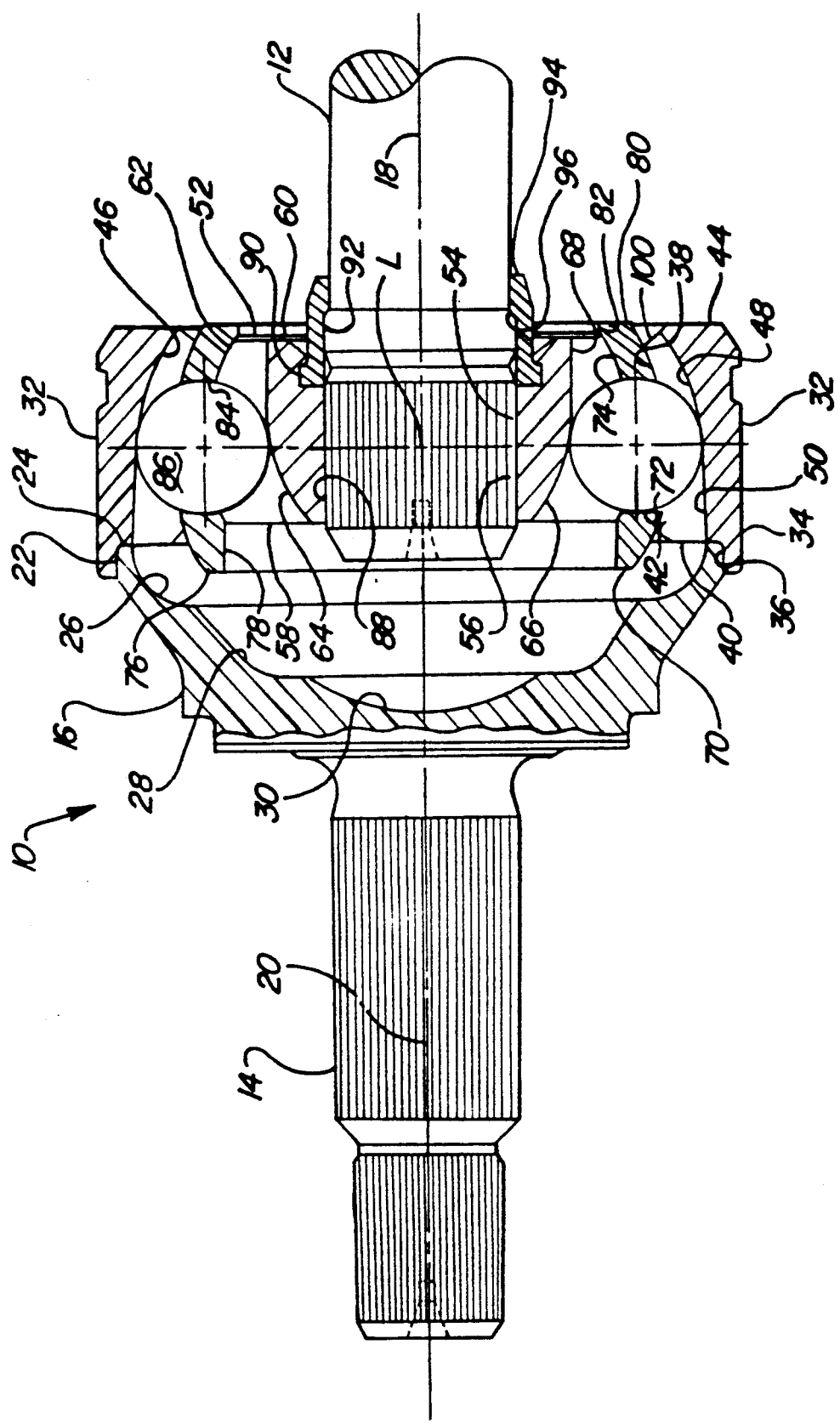
FIG. 1 is a part sectioned side view that shows the universal joint of the present invention.

FIG. 1 is a part sectioned side elevational view that shows the universal joint of the present invention. The overall apparatus is identified by the numeral 10 as shown. For purposes of illustration it will be assumed that a rotational force or torque is applied to an input shaft 12 which is shown at the right-hand side of FIG. 1. An output shaft 14 is positioned at the left-hand side of the overall apparatus 10. Of course, the flow of torque could be in a direction opposite to that above stated. The output shaft 14 is coupled to a hub 16 that can be, as shown, an integral part of the output shaft 14. The hub 16 and the output shaft 14 are coaxial along an output axis 20. An input axis 18 is shown coincidental with the output axis 20. The hub 16 has a cylindrical external surface 22 that abuts a radially inward lip 24. The lip 24 is planar and is perpendicular to the output axis 20. The hub 16 has a concavity that is formed by an arcuate section 26, a frustoconical section 28, and a spherical section 30. The blending together of the above three sections produces a concavity that can be readily formed by press and forge techniques.

An outer joint member 32 has an exterior surface 34 that is cylindrical about the output axis 20. The left-hand end of the outer joint member 32, as viewed in FIG. 1, has an internal cylindrical surface 36 of shorter radius than the exterior surface 34. The internal cylindrical surface 36 of the outer joint member 32 coacts with the cylindrical external surface 22 of the hub 16 in order to couple the hub 16 and the outer joint member 32 in a manner to be more fully described hereinafter relative to FIG. 2. The outer joint member 32 has an interior spherical surface 38. The interior spherical surface 38 is defined by a radius that has its locus situated on the input axis 18 at a point L. The left-hand end 40 of the outer joint member 32 is planar in configuration and has a radial extent spanning the distance between the internal cylindrical surface 36 and the interior spherical surface 38. The juncture between the end 40 and the interior spherical surface 38 can be beveled as identified by the number 42. The right-hand end 44 of the outer joint member 32 has a planar configuration and has a radial extent that extends between the exterior surface 34 and the interior spherical surface 38. The juncture between the end 44 and the interior spherical surface 38 is beveled at approximately 45° as will be commented on elsewhere. Thus, it is evident that a large cavity passes through the central axial region of the outer joint member 32.

Figures 5, 6:
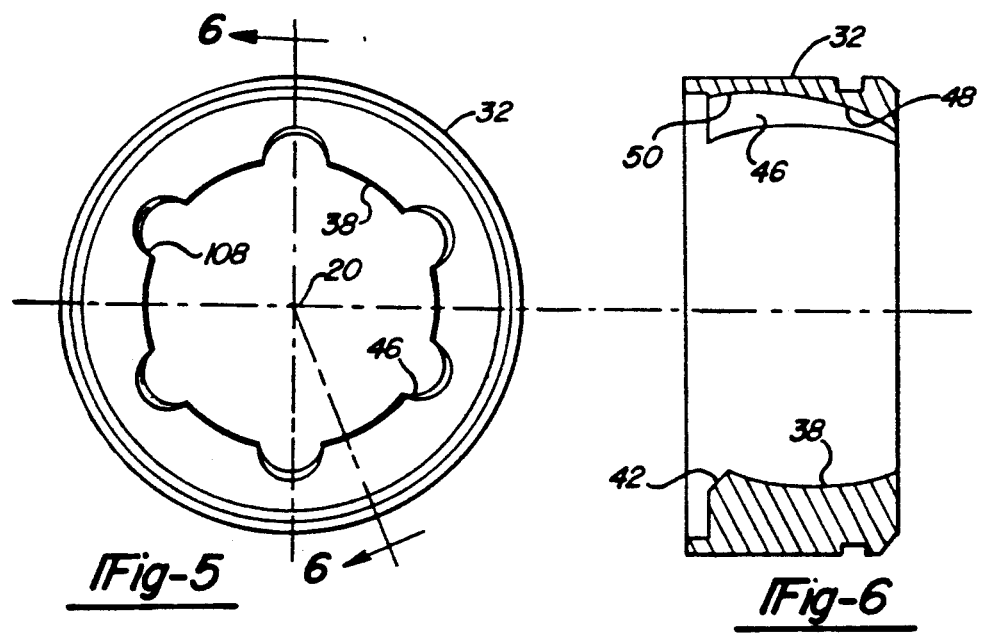
FIG. 5 is an elevational end view of the outer joint member that shows the pairs of grooves positioned on the interior surface thereof.
FIG. 6 is a sectioned view taken along section lines 6—6 of FIG. 5 which shows the curvilinear surfaces for the balls and the cage.

A plurality of axially extending arcuate ball races or grooves 46 are cut into and through the interior spherical surface 38 of the outer joint member 32. The mid line or, the most radially outward extent of each ball race has a circular section 48 that is coupled to an essentially linear section 50. The circular section 48 has a radius with a locus that is positioned on the output axis 20 to the left of the point L. The ball races 46 are positioned diametrically with respect to each other as is shown in FIG. 5. Each pair of diametrically opposed ball races 46 has their mid lines lying in a plane that also contains the output axis 20.

An inner joint member 52 is positioned within the open cavity that passes through the outer joint member 32. The inner joint member 52 is positioned symmetrically about the input axis 18. The inner joint member 52 has an internal cylindrical bore 54 that is equipped with axially extending splines 56. The inner joint member 52 has radially extending left and right-hand essentially planar ends 58 and 60. The most radial exterior surface 62 of the inner joint member 52 is spherical in configuration with the spherical extent terminating at the juncture with the planar ends 58 and 60.

The inner joint member 52 contains a plurality of axially extending arcuate ball races or grooves 64 that are cut into and through the exterior spherical surface 62. The mid line or, the most radial inward extent of each ball race 64 has a circular section 66 that is connected to an essentially linear section 68. The circular section 66 has a radius with a locus that is positioned on the input axis 18 to the right of the point L. The distance of the locus of the circular section 66 from the point L should be essentially equal to the distance of the locus of the circular section 48 of the outer joint member from the point L.

A ball cage 70 is positioned within the cavity of the outer joint member 32 and is spaced exteriorly of the inner joint member 52 in pivotable arrangement. The ball cage 70 has exterior and interior spherical surfaces 72 and 74 in offset relationship to each other but concentric with one another. The exterior spherical surface 72 is terminated at its left-hand end, as viewed in FIG. 1, by a radially inwardly extending end 76. The most radially inward portion of the end 76 intersects an axially extending cylindrical bore 78. The cylindrical bore terminates at its right-hand end with an intersection with the interior spherical surface 74. The exterior spherical surface 72 of the ball cage 70 terminates at its right-hand end by a radially inwardly extending end 80. The most radially inward portion of the end 80 intersects an axially extending cylindrical bore 82. The cylindrical bore 82 terminates at its left-hand end with an intersection with the interior spherical surface 74.

The exterior spherical surface 72 of the ball cage 70 is in rotational contact with the interior spherical surface 38 of the outer joint member 32. In a similar manner, the interior spherical surface 74 of the ball cage 70 is in rotational contact with the exterior spherical surface 62 of the inner joint member 52.

A plurality of radially extending circumferentially spaced bores or windows 84, equal in number to the groove pairs, are provided through the wall created by the exterior and interior spherical surfaces 72 and 74 of the ball cage 70. The axes of the bores 84 pass through the point L on the input shaft 12. Each axis of bores 84 is coincident with the mid line of the ball races 46 and 64. In other words, the axis of each bore 84 lies in a plane that contains the mid lines of each pair of mid lines associated with the ball races 46 and 64.

A spherical ball 86 is positioned within the confinement of each bore 84 so that it can translate simultaneously along the mid lines of the ball races 46 and 64.

The input shaft 12 has externally protruding splines 88 that mesh with the splines 56 that extend axially along the cylindrical bore 54 of the inner joint member 52.

The cylindrical bore 54 of the inner joint member 52 contains a reentrant groove 90 for the containment of a fingerlock retaining ring 92. A plurality of cantilevered resilient fingers 94 snap over a radially disposed ledge 96 that circumscribes the input shaft 12. Thus, the fingerlock retaining ring 92 prevents axial movement of the input shaft 12 with respect to the inner joint member 52.

Figure 2:
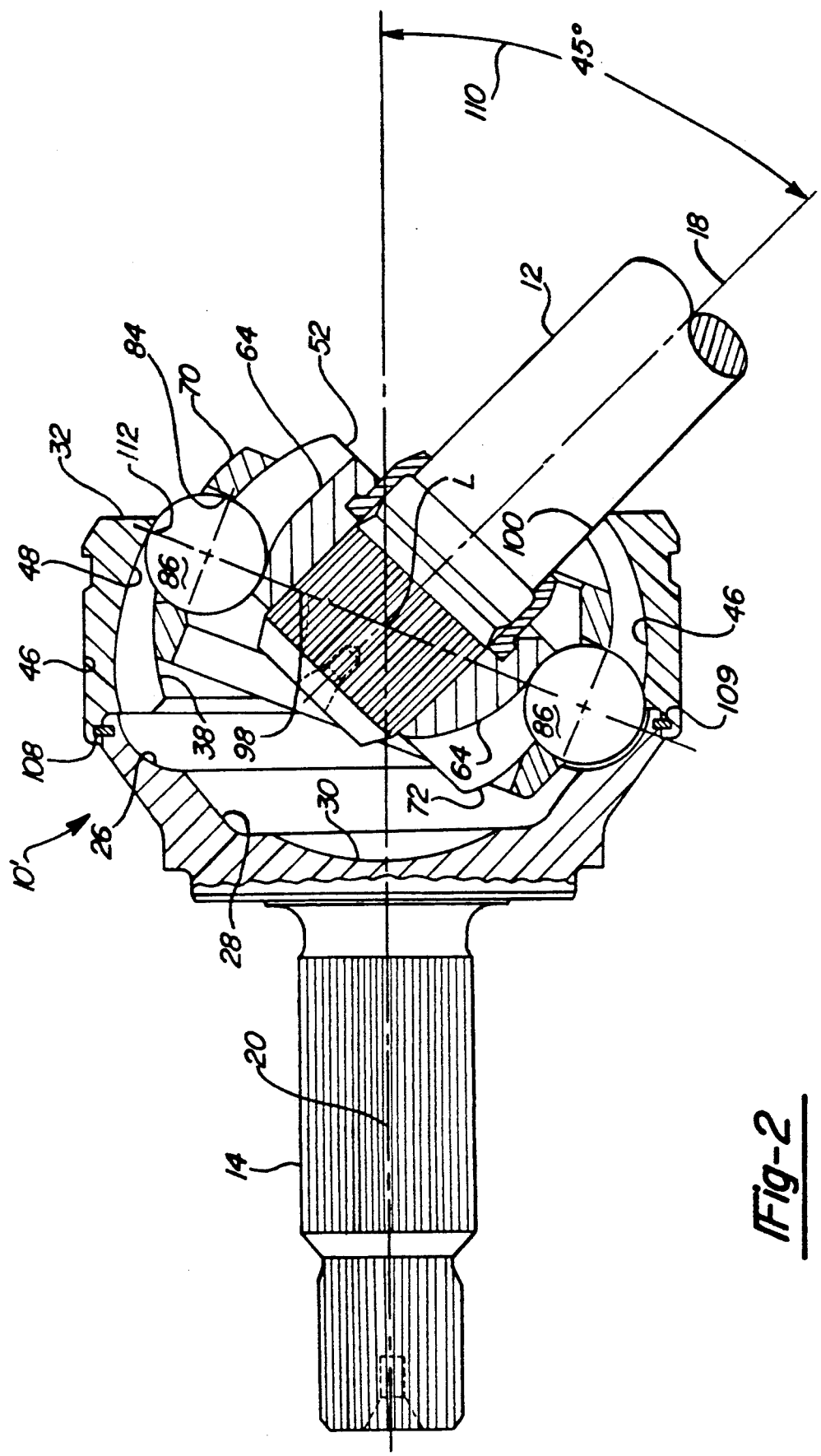
FIG. 2 is a part sectioned side view that shows the universal joint in an angular drive attitude.

FIG. 2 is a part sectioned side view of the overall apparatus 10 that shows the universal joint in an angular drive attitude. For purposes of discussion, the output shaft 14, the attached hub 16 and the outer joint member 32 remain in fixed relationship to one another and do not move, other than rotatively. As depicted in FIG. 2, the input shaft 12 has assumed a position so that its input axis 18 is angularly disposed with respect to the output axis 20 of the output shaft 14. As the input shaft 12 moves to a new angular position, the inner joint member 52 also moves through the same angle since it is fixed with respect to the input shaft 12. As the input shaft 12 moves through a given angle, the spherical balls 86 translate along the ball races 46 and 64. The most vertically oriented spherical ball 86 moves the furthest to the right while the lowest diametrically positioned spherical ball 86 moves correspondingly to the left along another pair of ball races 46 and 64. The remaining spherical balls 86 move correspondingly along the ball races 46 and 64. Of course, if a pair of spherical balls 86 lies on the input axis 18, there would be no translation along the ball races 46 and 64. The above discussion assumes that there is no rotation of the input and output shafts 12 and 14.

As the input shaft 12 and the inner joint member 52 articulate through a given angle, the ball cage 70 rotates a lesser amount as can be seen in FIG. 2. It is important that the ball cage 70 always articulates so that the axis 98 of the bores 84 remains positioned so that the point L lies thereon. In this manner, a constant velocity will be achieved through the overall apparatus 10.

An examination of the lower spherical ball 86 in FIG. 2 shows that it has moved to the left until it is in close proximity to the arcuate section 26 of the hub 16. Also, the lowermost portion of the ball cage 70 has moved to the left until it occupies part of the cavity defined by the frustoconical section 28. The ball cage 70 has contact with only the spherical balls 86, the interior spherical surface 38 of the outer joint member 32, and the exterior spherical surface 72 of the inner joint member 52.

The angular movement of the input shaft 12 is terminated when the input shaft 12 contacts a frustoconical beveled surface 100 of the outer joint member 32.

Figures 3, 4:
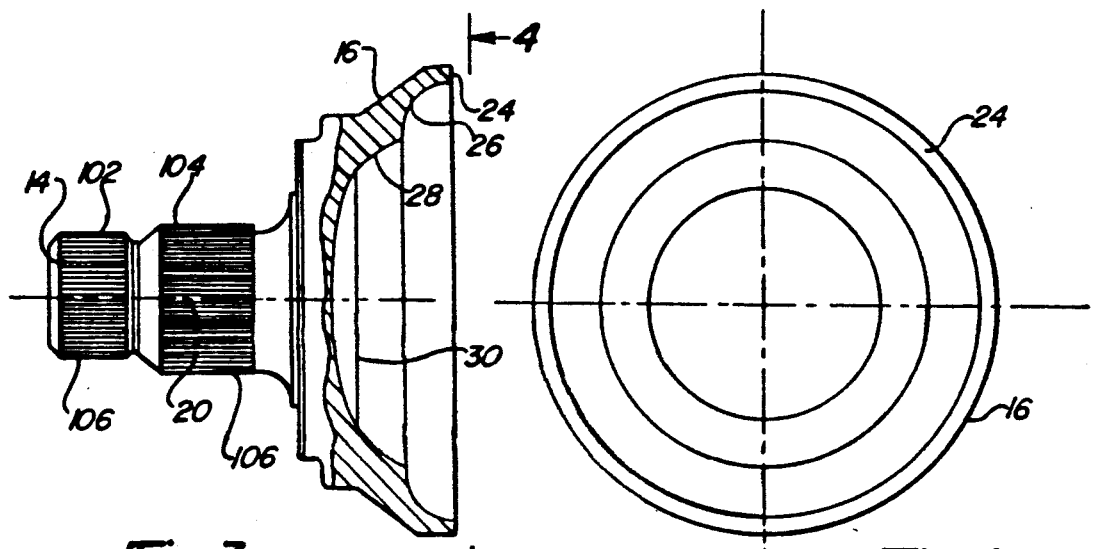
FIG. 3 is a part sectioned side elevational view of the integral hub and output shaft.
FIG. 4 is an end view of the hub and output shaft as viewed along lines 4—4 of FIG. 3.

FIG. 3 is a part sectioned side elevational view of the integral hub 16 and the output shaft 14. The output shaft 14 can be divided into cylindrical axial extents 102 and 104, each containing an arcuate array of longitudinally aligned splines 106. The hub 16, which is an extension of the output shaft 14, has an internal cavity defined by the arcuate section 26, the frustoconical section 28, and the spherical section 30. Since there is no undercutting required in the formation of the internal cavity of the hub 16, it can be formed by press or forging techniques.

FIG. 4 is an end view of the hub cavity as viewed along lines 4—4 of FIG. 3. The lip 24 is shown in its planar view along with the lines of intersection between the previously mentioned surfaces of the cavity within the hub 16.

FIG. 5 is an end view of the outer joint member 32 that shows the diametrically opposed pairs of grooves positioned on the interior spherical surface 38 of the outer joint member 32. As can be seen, the ball races 46 are not undercut; thus, they can be formed by press or forge techniques. If sintering techniques are employed in the fabrication of the outer joint member 32 then metal removal techniques need not be employed to form the spherical interior surface 38. The cross-sectional configuration of the ball race 46 is shown as circular with tangential parallel extensions 108 coupled thereto. While the extensions 108 are shown as parallel, they may, if desired, diverge slightly toward the input axis 18. Also, the arcuate cross-sectional portion of the ball race 46 can be slightly non-circular, providing for line contact with the spherical balls that translate therethrough.

FIG. 6 is a sectional side view taken along section lines 6—6 of FIG. 5 that shows the curvilinear surface of the circular and linear sections 48 and 50. The interior spherical surface 38 is also shown.

Figures 7, 8:
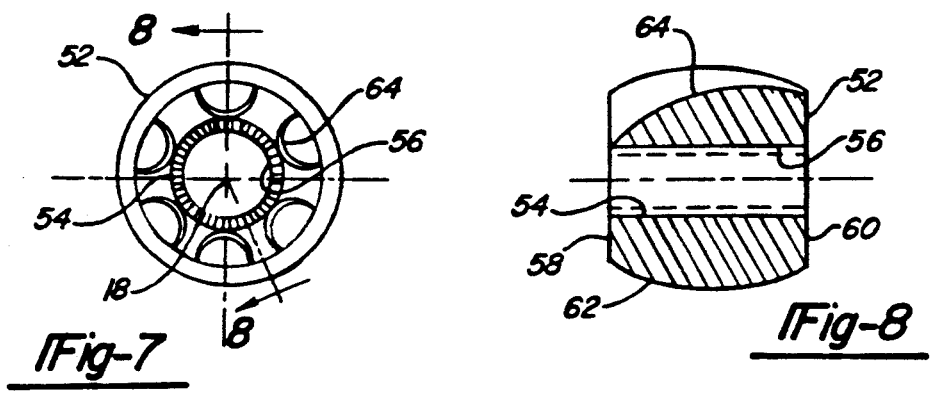
FIG. 7 is an end view of the inner joint member that shows the pairs of grooves positioned on the exterior surface of the inner joint member.
FIG. 8 is a sectioned view taken along section lines 8—8 of FIG. 7 that shows the curvilinear surfaces for the balls and the cage.

FIG. 7 is an end view of the inner joint member 52 that shows the pairs of diametrically opposed ball races 64 positioned on the exterior spherical surface 62 of the inner joint member 52. The number of ball races 64 equals the number of ball races 46 as previously shown in FIG. 5. The cylindrical bore 54 contains the splines 56 which are in axial alignment with the input axis 18.

FIG. 8 is a sectional view taken along section lines 8—8 of FIG. 7 that shows the curvilinear mid line of the ball race 64 and the exterior spherical surface 62 of the inner joint member 52. The planar left and right ends 58 and 60 permit the employment of easy fabrication techniques as previously commented on.

ASSEMBLY AND OPERATION

The assembly of the overall apparatus 10 of the present invention is very straightforward. Also, the geometry of the components of the overall apparatus 10 permit automated assembly. The inner joint member 52 is positioned so that its left-hand edge, as viewed in FIG. 1, is facing up. Next, the ball cage 70 is lowered concentrically, and in axial alignment, around the inner joint member 52 until the bores 84 are opposite the circular section 66 of the ball race 64. The spherical balls 86 are then inserted into each of the bores 84. As the spherical balls 86 move radially inward, they will contact the circular section 66 of the ball race 64 and remain stationary. The outer joint member 32 is then telescoped over the ball cage 70. The ball cage 70 is then moved into final axial alignment. The spherical balls 86 are now held against radially outward disengagement by the ball races 46. The cylindrical external surface 22 of the hub 16 is then moved into engagement with the internal cylindrical surface 36 of the outer joint member 32 and then immobilized therewithin. The immobilization technique can involve a press fit, welding, or a snap ring 109 as depicted in FIG. 2. At this time or subsequent thereto, the input shaft 12 can be inserted into the cylindrical bore 54 so that the splines 56 and 88 slide into engagement. Upon full insertion of the input shaft 12, the resilient fingers 94 of the previously inserted retaining ring 92 engage with the ledge 96 on the input shaft 12, locking it into its final position.

During operation of the overall apparatus 10, a torque is applied to the input shaft 12, causing it and the spline coupled inner joint member 52 to rotate. The torque is then transmitted from the inner joint member 52 to the spherical balls 86 by contact with the ball races 64. The spherical balls 86 then transmit the torque to the outer joint member 32 via the ball races 46. Since the outer joint member is non-rotatively attached to the lip 24 of the hub 16, the hub 16 rotates along with the integrally attached output shaft 14.

When the input and output axis 18 and 20, respectively, are in alignment with one another, the spherical balls 86 will remain at one location along the ball races 46 and 64 during rotation of the overall apparatus 10. Since the spherical balls are centrally positioned within the ball races 46 and 64, the stresses are fairly well distributed through the outer joint member 32 and the inner joint member 52.

As the input shaft 12 and its accompanying input axis 18 assume an angular position or bending angle, such as 45°, with respect to the output shaft 14 and its output axis 20, the spherical balls 86 no longer track in a single circular path about the input axis 18. During one complete revolution of the overall apparatus 10, the spherical balls 86 will traverse nearly the entire length of the ball races 46 and 64. Since the spherical balls 86 are fixed against lateral movement with respect to the ball cage 70, the ball cage 70 not only rotates on its exterior and interior spherical surfaces 72 and 74 but, also, the ball cage must rotate when the input axis 18 shifts position from left to right about an axis that passes through the point L. The rotational axis for the ball cage 70 is perpendicular to the input axis 18 only when the input and output axes 18 and 20 are in alignment. The amount and frequency of the rotation of the ball cage 70 about its axis depends on the frequency and magnitude of the change in the angle as identified in FIG. 2 by reference numeral 110. When the overall apparatus 10 is operating at a maximum bending angle, a maximum load occurs against the inside surface of the circular section 48 adjacent to the end 44 of the outer joint member 32. This point of maximum load is identified by numeral 112 in FIG. 2. Since the design of the outer joint member 32 is thickest at the end 44, it can withstand the high loads induced at the maximum load point 112. Then, too, the increased overall cross-section of the outer joint member 32 at the end 44 reduces the amount of detection of the end 44 in a circumferential or hoop direction. The reduced circumferential elongation results in longer life and increased durability of the overall apparatus.

While the illustrative embodiment of the invention has been described in considerable detail for the purpose of setting forth a practical operative structure whereby the invention may be practiced, it is to be understood that the particular apparatus described is intended to be illustrative only, and that the various novel characteristics of the invention may be incorporated in other structural forms without departing from the spirit and scope of the invention defined in the appended claims.

What is claimed is:

1. A constant velocity universal joint for use between a driven shaft and driving shaft for transmission of power from said driving shaft to said driven shaft, said constant velocity universal joint comprising:

an inner joint member having a first planar end, a second planar end spaced from said first planar end and an exterior spherical surface between said first and second planar ends, said inner joint member further having an axis of symmetry normally disposed to said first and second planar ends, and an aperture located about said axis of symmetry;

a drive means integral with one of said driven and driving shaft and said aperture to rotate said inner joint member;

a first plurality of longitudinally extending circumferentially spaced ball races formed in said spherical surface of said inner joint member;

an annular outer joint member surrounding said inner joint member, said annular outer joint member having one end, an opposite end, a hub abutment face, an outer cylindrical surface, an interior spherical surface, a first chamfered surface at the junction of said one end and said interior spherical surface, said interior spherical surface extending completely between said first chamfered surface and said hub abutment face and a central aperture defined by said interior spherical surface and said first chamfered surface, said outer joint member further having a centrally positioned axis therethrough;

a second plurality of longitudinally extending circumferentially spaced ball races formed in said interior spherical surface of said annular outer joint member, each ball race of said second plurality of longitudinally extending circumferentially spaced ball races of said annular outer joint member being aligned with an associated one of said first plurality of longitudinally extending circumferentially spaced ball races of said inner joint member;

a plurality of spherical balls disposed in said first plurality of longitudinally extending circumferentially spaced ball races of said inner joint member, each one of said plurality of spherical balls further extending into a respective one of said second plurality of longitudinal extending circumferentially spaced ball races of said annular outer joint member to provide a driving engagement between said inner and said annular joint members;

cage means interposed said inner joint member and said annular outer joint member, said cage means having an outer spherical surface in intimate contact with said interior spherical surface of said annular outer joint member; an inner spherical surface in intimate contact with said exterior spherical surface of said inner joint member; and a plurality of apertures, equal in number to said first and second plurality of longitudinally extending circumferentially spaced ball races, interposed between said outer spherical surface and said inner spherical surface for receiving each of said plurality of spherical balls;

said second plurality of longitudinally extending circumferentially spaced ball races of said annular outer joint member defining a converging contoured part-spherical part-cylindrical surface, said part-cylindrical surface being adjacent said hub abutment face of said annular outer joint member and said part-spherical surface being at said one end of said annular outer joint member such that the wall thickness between said second plurality of longitudinally extending circumferentially spaced ball races and said cylindrical surface is greater at said one end of said annular outer joint member than at said hub abutment face and such that as each of said plurality of spherical balls move along said second plurality of longitudinally extending circumferentially spaced ball races from said opposite end of said annular outer joint member towards said one end of said annular outer joint member, said plurality of spherical balls traverse along said part-cylindrical surface of said second plurality of longitudinally extending circumferentially spaced ball races to said converging part-spherical surface of said second plurality of longitudinally extending circumferentially spaced ball races; and a hub abutting said hub abutment face and attached to said opposite end of said annular outer joint member, said hub having a centrally positioned cavity mating with said part-cylindrical surface of said second plurality of longitudinally extending circumferentially spaced ball races of said annular outer joint member.

2. The constant velocity universal joint of claim 1 wherein said drive means comprises:

a first plurality of splines located within said aperture of said inner joint member; and wherein one of said driven and driving shafts comprises:

an input shaft having a second plurality of splines on one end thereof, said first and second plurality of splines connecting one of said driven and driving shafts to said inner joint member for rotation therewith; and further wherein said other of said driven shaft and driving shaft comprises:

an output shaft formed on an integral part of said hub, said output shaft having an axis coincident with said centrally positioned axis of said annular outer joint member.

3. The constant velocity universal joint of claim 1 wherein each of said apertures of said plurality of apertures of said cage means contains one of said spherical balls.

4. The constant velocity universal joint of claim 1 wherein said cage means interposed said inner joint member and said annular outer joint member is an annular ball cage having a central aperture and a central axis.

5. The constant velocity universal joint of claim 4 wherein said plurality of apertures of said cage means are of an even number.

6. The constant velocity universal joint of claim 5, wherein said plurality of apertures of said cage means are arranged in diametrically opposite pairs perpendicular to said central axis of said central aperture of said cage means.

7. The constant velocity universal joint of claim 1 wherein said first plurality of longitudinally extending circumferentially spaced ball races in said inner joint member have a minimum radial distance from said axis of symmetry of said inner joint member adjacent to said hub.

8. The constant velocity universal joint of claim 7 wherein each of said first plurality of longitudinally extending circumferentially spaced ball races are comprised of a curved section and a linear section.

9. The constant velocity universal joint of claim 1 wherein said second plurality of longitudinally extending circumferentially spaced ball races in said annular outer joint member have a maximum radial distance from said centrally positioned axis of said annular outer joint member adjacent to said hub.

10. The constant velocity universal joint of claim 9 wherein each of said second plurality of longitudinally extending circumferentially spaced ball races are comprised of a curved section and a linear section.

11. The constant velocity universal joint of claim 1 wherein said exterior spherical surface of said inner joint member is of greater radial extent from said axis of symmetry of said inner joint member than said first plurality of longitudinally extending circumferentially spaced ball races contained therein, and wherein said interior spherical surface of said annular outer joint member is of lesser radial extent from said centrally positioned axis of said annular outer joint member than said second plurality of longitudinally extending circumferentially spaced ball races contained therein.

12. The constant velocity universal joint of claim 11 wherein said exterior spherical surface of said inner joint member and said interior spherical surface of said annular outer joint member are concentric with one another.

13. A constant velocity universal joint for use between a driven shaft and a driving shaft for transmission of power from said driving shaft to said driven shaft, said constant velocity universal joint comprising:

an inner joint member having an axis of symmetry, an exterior spherical surface, a central splined aperture concentric with said axis of symmetry, and a first plurality of longitudinally extending circumferentially spaced ball races formed in said exterior spherical surface; each ball race of said first plurality of longitudinally extending circumferentially spaced ball races having a cylindrical portion and a contiguous spherical portion which converges towards said axis of symmetry;

drive means having a plurality of external splines adapted to be received in said central splined aperture of said inner joint member;

an annular outer joint member having a central axis, one end, an opposite end, a hub abutment face, an outer cylindrical surface, an interior spherical surface, a first chamfered surface at the junction of said one end and said interior spherical surface, said interior spherical surface extending completely between said first chamfered surface and said hub abutment face, and a centrally positioned aperture therethrough, said annular outer joint member being positioned in surrounding relationship to said inner joint member, said annular outer joint member further having a second plurality of longitudinally extending circumferentially spaced ball raced formed in said interior spherical surface, each of said second plurality of longitudinally extending circumferentially spaced ball races having a cylindrical portion adjacent said hub abutment face of said annular outer joint member and a contiguous spherical portion which converges towards said central axis adjacent said one end of said annular outer joint member such that the wall thickness between said second plurality of longitudinally extending circumferentially spaced ball races and said outer cylindrical surface is greater at said one end of said annular outer joint member than at said hub abutment face;

a plurality of spherical balls located in said first and second plurality of longitudinally extending circumferentially spaced ball races of said inner and annular outer joint members;

an annular ball cage member interposed said inner joint member and said annular outer joint member for the containment of said plurality of spherical balls, said annular ball cage member having an outer spherical surface is intimate contact with said exterior spherical surface of said inner joint member, a centrally positioned aperture, and a plurality of circumferentially spaced radially aligned apertures, equal in number to said first and second plurality of longitudinally extending circumferentially spaced ball races, between said inner and outer spherical surfaces for receiving one each of said plurality of spherical balls; and a hub abutting said hub abutment face and attached to said opposite end of said annular outer joint member, said hub having a centrally positioned cavity therein;

said exterior spherical surface of said inner joint member being a greater radial extend from said axis of symmetry than said first plurality of longitudinally extending circumferentially spaced ball races; and said interior spherical surface of said annular outer joint member being of lesser radial extent from said central axis than said second plurality of longitudinally extending circumferentially spaced ball races of said annular outer joint member.

14. The constant velocity universal joint of claim 13 wherein said plurality of circumferentially spaced apertures in said annular ball cage member are of an even number.

15. The constant velocity universal joint of claim 14 wherein said plurality of circumferentially spaced apertures are arranged in diametrically opposite pairs perpendicular to a central axis of said centrally positioned aperture.

16. The constant velocity universal joint of claim 13 wherein said annular ball cage member has interior and exterior spherical surfaces that are concentric with one another. central.

17. The constant velocity universal joint of claim 13 wherein said first plurality of longitudinally extending circumferentially spaced ball races in said inner joint member have a minimum radial distance from said axis of symmetry of said inner joint member and further wherein said first plurality of longitudinally extending circumferentially spaced ball races are comprised of a curved section adjacent said hub and a linear section contiguous to said curved section.

18. The constant velocity universal joint of claim 13 wherein said second plurality of longitudinally extending circumferentially spaced ball races in said annular outer joint member have a maximum radial distance from said central axis of said annular outer joint member and further wherein said second plurality of longitudinally extending circumferentially spaced ball races are comprised of a linear section adjacent said hub and a curved section contiguous to said linear section.

19. The constant velocity universal joint of claim 13 wherein said exterior spherical surface of said inner joint member and said interior spherical surface of said annular outer joint member are concentric with each other.

20. The constant velocity universal joint of claim 13 wherein said hub and said annular outer joint member are united by a snap ring.

21. The constant velocity universal joint of claim 13 wherein said annular outer joint member has a greater wall thickness on an opposite end most remote from said hub.

22. The constant velocity universal joint of claim 13 wherein a retaining ring is interposed said inner joint member and said drive means.

* * * * *